(12) United States Patent
Gebert et al.

(10) Patent No.: US 11,370,296 B2
(45) Date of Patent: Jun. 28, 2022

(54) STIFFENING ELEMENT FOR A LIQUID CONTAINER FOR A MOTOR VEHICLE AND LIQUID CONTAINER FOR A MOTOR VEHICLE WITH A STIFFENING ELEMENT

(71) Applicant: KAUTEX TEXTRON GmbH & Co. KG, Bonn (DE)

(72) Inventors: Klaus Gebert, Willich (DE); Frank Quant, Bonn (DE); Daniel Marx, Bedburg (DE); Harald Lorenz, Bad Neuenahr-Ahrweiler (DE); Andre Van Megern, Cologne (DE)

(73) Assignee: KAUTEX TEXTRON GmbH & Co. KG, Bonn (DE)

( * ) Notice: Subject to any disclaimer, the term of this patent is extended or adjusted under 35 U.S.C. 154(b) by 293 days.

(21) Appl. No.: 16/339,757

(22) PCT Filed: Oct. 6, 2017

(86) PCT No.: PCT/EP2017/075549
§ 371 (c)(1),
(2) Date: Apr. 5, 2019

(87) PCT Pub. No.: WO2018/065605
PCT Pub. Date: Apr. 12, 2018

(65) Prior Publication Data
US 2020/0047607 A1    Feb. 13, 2020

(30) Foreign Application Priority Data
Oct. 7, 2016  (DE) .................... 102016219539.5

(51) Int. Cl.
*B60K 15/03*  (2006.01)
*B29C 49/20*  (2006.01)
(Continued)

(52) U.S. Cl.
CPC .............. *B60K 15/03* (2013.01); *B29C 49/20* (2013.01); *B29C 66/7234* (2013.01);
(Continued)

(58) Field of Classification Search
CPC ........ B65D 25/20; B65D 51/16; B60K 15/03; B60K 15/03177; B60K 15/077;
(Continued)

(56) References Cited

U.S. PATENT DOCUMENTS 2,407,455 A * 9/1946 Shakesby ............... B64D 37/02
                                                      220/653
3,280,850 A * 10/1966 Aylor ....................... F02K 9/64
                                                      138/153
(Continued)

FOREIGN PATENT DOCUMENTS

CN   102802993 A    11/2012
CN   202557283 U  * 11/2012
(Continued)

OTHER PUBLICATIONS

Korean Office Action with Translation Application No. 10-2019-7012376 dated May 5, 2020 13 pages.
(Continued)

*Primary Examiner* — J. Gregory Pickett
*Assistant Examiner* — Brijesh V. Patel
(74) *Attorney, Agent, or Firm* — Whitmyer IP Group, LLC (57) ABSTRACT

A reinforcing element for a liquid container for a motor vehicle, having at least one connecting section for connecting the reinforcing element to the liquid container, the connecting section having at least a first and a second web which are made from a first material and are enclosed at least in sections by a second material, the second material penetrating through openings of the webs, and the first web (Continued)

being at a smaller spacing from a longitudinal axis of the reinforcing element than the second web.

18 Claims, 7 Drawing Sheets

(51) Int. Cl.
*B29C 65/00* (2006.01)
*B29L 31/00* (2006.01)

(52) U.S. Cl.
CPC ............. *B29L 2031/7172* (2013.01); *B60K 2015/0346* (2013.01); *B60K 2015/03493* (2013.01)

(58) Field of Classification Search
CPC .... B60K 2015/0344; B60K 2015/0346; B60K 2015/03467; B60K 2015/03493; B60K 2015/03032; B60K 2015/0775; B29C 49/20; B29C 66/7234; B29L 2031/7172
USPC .... 220/4.12–4.14, 4.21, 4.27, 501, 562–564, 220/567.2, 653, 675, 651, 590, 682; 156/91, 245, 172; 138/153; 29/428
See application file for complete search history.

(56) References Cited

U.S. PATENT DOCUMENTS

| | | | |
|---|---|---|---|
| 3,490,655 A * | 1/1970 | Ledgett | B01F 5/243 222/196 |
| 4,634,028 A * | 1/1987 | de Larosiere | B65D 25/02 215/10 |
| 6,135,306 A * | 10/2000 | Clayton | B60K 15/03177 220/501 |
| 6,138,859 A * | 10/2000 | Aulph | B60K 15/03 220/563 |
| 6,338,420 B1 * | 1/2002 | Pachciarz | B60K 15/03177 220/4.13 |
| 6,669,396 B2 * | 12/2003 | Mattle | F16B 25/0057 403/294 |
| 6,726,967 B2 * | 4/2004 | Vorenkamp | B29B 13/023 428/34.1 |
| 7,455,190 B2 * | 11/2008 | Potter | B60K 15/03177 220/4.12 |
| 8,608,012 B2 * | 12/2013 | Aoki | B60K 15/03177 220/563 |
| 8,991,637 B2 * | 3/2015 | Boecker | B60K 15/03177 220/562 |
| 9,027,781 B2 * | 5/2015 | Criel | B60K 15/03177 220/562 |
| 9,266,285 B2 * | 2/2016 | Tabuchi | B29C 65/7814 |
| 9,266,427 B2 * | 2/2016 | Hill | B60K 15/03177 |
| 9,617,034 B2 * | 4/2017 | Heidemeyer | B60K 15/03177 |
| 2005/0011891 A1 * | 1/2005 | Austerhoff | B60K 15/03006 220/4.12 |
| 2010/0229565 A1 * | 9/2010 | Boman | F02K 9/64 60/752 |
| 2010/0237080 A1 | 9/2010 | Gebert et al. | |
| 2011/0174946 A1 | 7/2011 | Araya et al. | |
| 2012/0138606 A1 * | 6/2012 | Varga | B60K 15/03177 220/4.21 |
| 2012/0325822 A1 * | 12/2012 | Pozgainer | B60K 15/03177 220/562 |
| 2015/0014307 A1 | 1/2015 | Pozgainer et al. | |
| 2015/0217635 A1 | 8/2015 | Nakane et al. | |
| 2015/0344183 A1 * | 12/2015 | Quant | B65D 25/20 220/567.2 |
| 2016/0214477 A1 | 7/2016 | Boecker et al. | |
| 2016/0243930 A1 * | 8/2016 | Criel | B60K 15/03177 |
| 2016/0263990 A1 * | 9/2016 | Gebert | B29C 49/20 |
| 2019/0105983 A1 * | 4/2019 | Kim | B60K 15/03177 |
| 2019/0232780 A1 * | 8/2019 | Jiang | B60K 15/03 |

FOREIGN PATENT DOCUMENTS

| | | | |
|---|---|---|---|
| CN | 104477027 A | * | 4/2015 |
| CN | 204249813 U | * | 4/2015 |
| CN | 105538659 A | * | 5/2016 |
| CN | 205523672 U | * | 8/2016 |
| CN | 108382195 A | * | 8/2018 |
| DE | 102013003247 A1 | | 9/2014 |
| DE | 102013018922 A1 | | 5/2015 |
| EP | 2823979 A1 | | 1/2015 |
| EP | 2865553 A1 | | 4/2015 |
| KR | 20160078371 A | | 7/2016 |

OTHER PUBLICATIONS

Indian Office Action and Translation; Application No. 201927013489; dated Sep. 12, 2020; 8 Pages.
Translation of International Preliminary Report on Patentability Application No. PCT/EP2017/075549 Completed: Jan. 17, 2019; dated Apr. 18, 2019 10 pages.
International Preliminary Report on Patentability Application No. PCT/EP2017/075549 dated Jan. 17, 2019 17 pages.
International Search Report of the International Searching Authority & Translation Application No. PCT/EP2017/075549 Completed: Jan. 10, 2018; dated Jan. 18, 2018 5 pages.
Written Opinion of the International Searching Authority Application No. PCT/EP2017/075549 Completed: Jan. 10, 2018; dated Jan. 18, 2018 9 pages.
Chinese Office Action; Application No. 201780061807; dated Sep. 2, 2021; 9 Pages.

* cited by examiner

STIFFENING ELEMENT FOR A LIQUID CONTAINER FOR A MOTOR VEHICLE AND LIQUID CONTAINER FOR A MOTOR VEHICLE WITH A STIFFENING ELEMENT

TECHNICAL FIELD

The invention relates to a reinforcing element for a liquid container for a motor vehicle, and to a liquid container for a motor vehicle having a reinforcing element of this type. Reinforcing elements for liquid containers serve to keep and stiffen the shape of the liquid container under static and dynamic operating loads in a motor vehicle. In particular, in the case of liquid containers which are assembled from two half shells, reinforcing elements serve to strengthen the container structurally. Here, there is firstly the requirement that the reinforcing elements should be of as lightweight design as possible, in order to keep the weight of the liquid container overall low. Furthermore, a reliable connection is to be established between the reinforcing element and inner walls of the container which are as a rule configured in multiple layers.

BACKGROUND

The present invention is based on the technical problem of specifying an improved reinforcing element for a liquid container for a motor vehicle. Furthermore, a liquid container for a motor vehicle having a reinforcing element is to be specified.

The above-described technical problem is solved by way of a reinforcing element and a liquid container as disclosed.

SUMMARY

In accordance with a first aspect, the invention relates to a reinforcing element for a liquid container for a motor vehicle, having at least one connecting section for connecting the reinforcing element to the liquid container for a motor vehicle, the connecting section having at least a first and a second web which are made from a first material and are enclosed at least partially by a second material, the second material penetrating through openings of the webs.

The liquid container can be, for example, a fuel tank.

The liquid container can be a container for storing urea solution for an SCR catalytic converter.

The liquid container can be a container for storing cooling liquid, for example for cooling an engine or a battery.

The liquid container can have a multiple-layer wall construction. For instance, a sandwich or layer construction of a wall of the liquid container can have a layer which provides a diffusion barrier for a liquid to be stored. A diffusion barrier of this type can be enclosed, for example, on two sides by at least two further layers.

The two-component design makes it possible to optimize the reinforcing element in sections. For instance, the first material can have a high strength with a low weight, whereas the second material is optimized with regard to the welding capability to a material of a tank wall.

On account of the penetration of the through openings by way of the second material, a reliable positively locking connection can be provided between the first and the second material.

It is provided in accordance with a further refinement of the reinforcing element that the first web is at a smaller spacing from a longitudinal axis of the reinforcing element than the second web.

By virtue of the fact that at least a first and a second web are arranged relative to one another at an offset with respect to the longitudinal axis, a plurality of positively locking connections can be formed between the first material and the second material, as viewed in a section transversely with respect to the longitudinal axis. A reliable connection can thus be configured between the first material and the second material, it being possible for static and dynamic operating loads to be distributed to a plurality of webs.

The first web can be arranged at least in sections between the longitudinal axis and the second web. The webs therefore have a radial offset or a radial spacing with respect to one another in a radial direction which is oriented transversely with respect to the longitudinal axis. In other words, the first and the second web are arranged at least in sections in alignment, as viewed, starting from the longitudinal axis, in a direction transversely with respect to the longitudinal axis.

Through openings which are filled with a second material can be oriented transversely with respect to the longitudinal axis, in order to introduce loads which are oriented along the longitudinal axis from the first material into the second material, and vice versa.

In accordance with a further refinement of the reinforcing element, the webs are arranged at least in sections in the manner of a double wall. In this way, a compact arrangement of the webs can be achieved. An intermediate space which is formed between the webs can be filled by a second material. Furthermore, the webs can be enclosed on two sides by a second material, with the result that a five-layer wall construction can be realized as viewed in a section transversely with respect to the longitudinal axis.

As viewed in a section transversely with respect to the longitudinal axis, the reinforcing element can be constructed at least in sections in the manner of a sandwich structure, it being possible for the sandwich structure to have, for example, five layers. Thus, for example, a first layer made from a second material is surrounded at least in sections on two sides by two layers made from a first material, said layers made from a first material in turn being surrounded by layers of the second material.

As an alternative or in addition, the first web can form a first sleeve and the second web can form a second sleeve. The second sleeve encloses the first sleeve on the circumferential side at least in sections. A multiple-layer wall construction can be realized in a simple way by way of the nested sleeves.

Three or more webs can be provided. In this way, operating loads can be distributed to a plurality of webs. If, for example, three webs are provided which are realized, for example, by way of three sleeves which are arranged in a manner which is nested inside one another, a seven-layer wall construction can be achieved.

The first and the second web can be at a constant radial spacing from one another at least in sections, as viewed in a height extent of the webs which is measured along the longitudinal axis, the radial spacing being measured, in particular, orthogonally with respect to the longitudinal axis.

Two webs can converge in a common groove bottom or can extend starting from a common groove bottom. In this way, the webs can be molded onto a collar or onto an intermediate section or center part of the reinforcing element in a simple way, for example in one piece in an injection molding method. An intermediate section or center part of this type can be arranged, for example, between two connecting sections which are provided at opposite ends of the reinforcing element, and can connect said connecting sections to one another along the longitudinal axis.

As measured along the longitudinal axis, the first web and the second web can have the same height and/or can terminate on the end side flush with respect to a common flat plane which is oriented orthogonally with respect to the longitudinal axis. In this way, a compact overall design of the reinforcing element can be achieved.

The first and the second web can have the same wall thickness, in order to facilitate the production capability in an injection molding method.

A wall thickness or web thickness of a web which is measured in a direction transversely with respect to the longitudinal axis can be from 2 mm to 8 mm. A web height of a web which is measured parallel to the longitudinal axis L can be from 10 mm to 80 mm. A diameter or an envelope of a through opening of a web can be from 3 mm to 20 mm, it being possible for the through openings to have a circular, oval or polygonal shape in cross section.

The second material can be connected to the webs of the first material in an injection molding method. Here, the second material can enclose the first material in such a way that the second material for its part configures webs which engage around the webs of the first material or engage into intermediate spaces which are formed between the webs of the first material.

The second material can be formed in the manner of a cap which surrounds and encloses the first material on the end side in the region of the webs and penetrates said first material in the region of the through openings.

In particular, transverse struts can be formed between webs of the second material, which transverse struts are arranged in the through openings of the webs of the first material.

The transverse struts can have a circular diameter or an enveloping diameter of from 3 mm to 20 mm, it being possible for the transverse struts to have a circular, oval or polygonal shape in cross section.

On the end side, channels can be formed into the second material, which channels are provided for the discharge of liquid between an inner wall of the liquid container and an end side of the reinforcing element, which end side is connected to the inner wall.

The webs can have a polygonal shape, such as a pentagon, a hexagon or the like, as viewed in a section transversely with respect to the longitudinal axis. The webs can thus be produced in the injection molding method in a simple way. A web with a polygonal shape can be formed, for example, from two or more web segments which can have planar faces and which are connected to one another via radius or corner segments.

A web segment can have one or more through openings which extend, in particular, transversely with respect to the longitudinal axis of the reinforcing element. For example, two, three, four or more through openings can be provided on a web segment of this type. The web segments can be arranged at an angle with respect to one another, as viewed relative to the longitudinal axis. A web segment of the first web can be assigned a web segment of the second web, which web segment is spaced apart from the former, in order to achieve a symmetrical construction and homogeneous loading of the webs by way of operating loads.

The webs can be assigned ventilating openings. The ventilating openings can ensure that an intermediate region which is formed between the webs can be filled with a second material, it being possible for air which is present in said intermediate region to be displaced via the ventilating openings by way of the second material, for example, in an injection molding method.

For example, the ventilating openings are bores or recesses which, starting from an intermediate space which is formed between the webs and is filled with a second material, open into a circumferential-side, outer shell face or an inner shell face of the reinforcing element.

A plurality of ventilating openings can be provided. For example, each web segment or a pair of web segments which are spaced apart from one another and comprise a first and a second web can be assigned a ventilating opening.

In order to achieve a reinforcing element which is of as lightweight a construction as possible, the reinforcing element can have a through opening which extends along the longitudinal axis and is surrounded on the circumferential side at least in sections by the first web and/or the second web. In addition to the aspect of material saving, the through opening which extends along the longitudinal axis additionally provides the possibility of storing fuel in said region in the finally assembled state, with the result that the reinforcing element produces merely a small restriction of the available tank volume.

The through opening which extends along the longitudinal axis can be, in particular, a central through opening which penetrates the reinforcing element along its entire length as measured along the longitudinal axis.

In order to achieve simple and inexpensive manufacturing of the through openings of the webs, it is provided in accordance with a further refinement of the reinforcing element that a through opening of the first web is arranged at least in sections in alignment with a through opening of the second web, as viewed, starting from a longitudinal axis, in a direction transversely with respect to the longitudinal axis.

Every through opening of the first web can be arranged in alignment with a through opening of the second web, as viewed in a direction transversely with respect to the longitudinal axis.

The through openings can be arranged on one or more webs in multiple rows and/or in a grid-like manner. A plurality of positively locking connections can thus be established between the second material and the first material both along a height extent of the reinforcing element as measured along the longitudinal axis and in a direction transversely with respect thereto, in order to achieve a reliable connection between the first material and the second material.

The through openings which are formed in the webs of the first material and are filled with a second material can have a circular, oval or polygonal shape. Load peaks as a consequence of a notch effect can be avoided by way of a circular or oval cross-sectional shape. A circular cross-sectional shape can be produced inexpensively.

The through openings in the webs of the first material can be formed, for example, by way of mandrel-shaped or pin-shaped mold components or mold slides within an injection mold which are pulled from or out of a mold cavity after the injection molding operation. Pulling out takes place, for example, in a linear movement along a longitudinal axis of a mandrel or pin of this type. Through openings can thus be formed on two or more webs in a simple way.

It is provided in accordance with a further refinement that the second material encloses the at least two webs, that is to say the first web and the second web, on the end side and on the circumferential side and penetrates said webs. A reliable connection can thus be established between the first material and the second material.

In order to achieve inexpensive manufacturing of the reinforcing element, in particular by way of injection molding, the reinforcing element can be assembled from two half shells.

In particular, the half shells can have identical geometries. The half shells can thus be produced, for example, by means of a single injection molding cavity. Furthermore, the production of the reinforcing element from two half shells affords the advantage that conversion or attachment parts can possibly be fastened to or in the reinforcing element before the assembly of the half shells.

The half shells can have connecting elements which engage into one another in a positively locking manner, in order to provide an inexpensive connection and/or prefixing for subsequent mutual welding of the half shells to one another and/or to a tank. Mold elements, such as grooves or mandrels, can thus be provided on the half shells, which mold elements can engage into one another in a positively locking manner and/or can be pressed into one another, in order to fix the half shells with respect to one another. An interference fit can be formed between mold elements of the half shells which are assigned to one another.

The half shells can be connected to one another in an integrally joined manner. A non-releasable connection can thus be produced between the half shells.

If the reinforcing element is formed from two half shells, the half shells can be joined along a longitudinal or connecting plane which comprises, in particular, the longitudinal axis.

In order to achieve a reliable attachment of the reinforcing element to two half shells of a liquid container and/or an inner wall of a liquid container, in each case one connecting section can be provided at opposite ends of the reinforcing element.

The connecting sections which are arranged at opposite ends of the reinforcing element can be connected to one another via struts made from a first material, spacings being formed between the struts, with the result that a through opening which extends along the longitudinal axis is delimited merely in sections by the struts. In this way, fuel which is stored in a liquid container for a motor vehicle can be stored even in the region of the through opening which extends along the longitudinal axis.

The reinforcing element can have one or more predetermined break points, with the result that, in the case of an excessive transverse load or shear load and/or longitudinal load of the liquid container in the case of a crash, the reinforcing element is split into two halves, in order to prevent a destruction of the tank wall and to avoid an escape of fuel.

A connecting section can be formed completely from a second material in the region of an end-side end of the reinforcing element. In particular, sections which are made from a second material and project on the end side can be provided as welding reserves for connection to a tank inner wall.

It is provided in accordance with a further refinement of the reinforcing element that the first material is a PAI (polyamide-imide), PEEK (polyether ether ketone), PAEK (polyaryletherketone), PPA (polyphthalamide), PBT (polybutylene terephthalate), PE (polyethylene), HDPE (high-density polyethylene), POM (polyoxymethylene), PPS (polyphenylene sulfide) or PA (polyamide), and/or that the second material is a PAI (polyamide-imide), PEEK (polyether ether ketone), PAEK (polyaryletherketone), PPA (polyphthalamide), PBT (polybutylene terephthalate), PE (polyethylene), HDPE (high-density polyethylene), POM (polyoxymethylene), PPS (polyphenylene sulfide) or PA (polyamide). For example, the first material can be a POM and the second material can be an HDPE.

The second material can preferably be welded to a tank wall.

The first material and/or the second material can be fiber reinforced.

It is provided in accordance with a further refinement of the reinforcing element that the pull-off forces between the first and the second material are greater than or equal to 15 kN. To this end, the reinforcing element is welded at opposite ends in each case to a plate, the plate being produced from a material of the liquid container or a wall material of the liquid container. The end-side plates are clamped in a drawing machine by way of a clamping apparatus which makes a homogeneous introduction of force possible, and are loaded until fracture at a drawing speed of 50-100 mm/minute. Here, the plates are moved apart from one another in opposite directions along a longitudinal axis of the reinforcing element.

It is provided in accordance with a further refinement of the reinforcing element that the tensile strength of the first material exceeds the yield stress of the second material by the factor 2.6 or less. The tensile strength and the yield stress can be determined, in particular, in accordance with DIN EN ISO 527.

In particular, the above-described pull-off forces of 15 kN or more can be achieved by the objective embodiment of the connection between the first and the second material with material combinations, in the case of which the tensile strength of the first material exceeds the yield stress of the second material by the factor 2.6 or less.

It is provided in accordance with a further refinement of the reinforcing element that the first web and the second web are at a constant spacing from one another at least in sections. As an alternative or in addition, the first web and/or the second web can have a cuboid or plate-shaped section, and the through openings can be arranged in the cuboid or plate-shaped section. The webs can thus be produced in an inexpensive and simple way as wall elements with a constant wall thickness in an injection molding method. In particular, the plate-like sections can have parallel planar faces which face one another, in order to facilitate an introduction of a second material into a region which is formed between the plate-like sections.

Through openings can be provided in the plate-shaped webs, which through openings are arranged in alignment or have an offset with respect to one another.

The webs can be branched in a fork-like manner starting from a center piece of the reinforcing element. In particular, the webs can extend so as to project along a longitudinal direction or a longitudinal axis.

In each case one connecting section can be provided at a first end and a second end of the reinforcing element, which second end lies opposite the first end, and the connecting sections can be connected to one another via a center piece.

The reinforcing element can have a center piece which has one or more struts.

The reinforcing element can have, for example, a single strut which has in each case one connecting section on two opposite end regions. The individual strut can be shaped in a plate-like manner and can have a constant thickness. Furthermore, the connecting sections can be branched in a fork-shaped manner, starting from the plate-like strut. The reinforcing element can thus be produced inexpensively as an injection molded component with a substantially constant wall thickness.

The through openings of the webs can have an axial offset with respect to one another. A central longitudinal axis of a first through opening of the first web can thus run at a spacing from a central longitudinal axis of a second through opening of the second web. In particular, the longitudinal axes of the first and the second through opening can run in parallel with one another and at a spacing from one another.

In particular, a first grid-like or row-like arrangement of through openings can be provided on a first web, which arrangement differs from a second grid-like or row-like arrangement of the through openings of the second web. For example, the first web can have a single-row arrangement of through openings, whereas the second web has a double-row or multiple-row arrangement of through openings. As a result of the individual arrangement of the through openings, the connection between the first and the second material can be adapted to the operating loads to be absorbed in the finally assembled state.

An offset between through openings of the first web and through openings of the second web can be realized particularly simply and inexpensively in terms of manufacturing technology in an injection molding method, in particular for the case where the webs in each case have a cuboid or plate-shaped section, in which the through openings are provided.

In accordance with a further aspect, the invention relates to a liquid container for a motor vehicle, having an above-described reinforcing element, the reinforcing element being arranged in an interior space of the liquid container.

The liquid container, in particular a fuel tank, can be assembled from two half shells, a first connecting section of the reinforcing element being assigned to a first half shell of the liquid container and being connected to the latter, and a second connecting section of the reinforcing element being assigned to a second half shell of the liquid container and being connected to the latter.

The half shells can be welded to the connecting sections, the half shells and the connecting sections comprising plastics which can be welded to one another.

BRIEF DESCRIPTION OF THE DRAWINGS

In the following text, the invention will be described in greater detail using the accompanying drawings, which diagrammatically illustrate exemplary embodiments, and in which.

DETAILED DESCRIPTION

Figure 1:
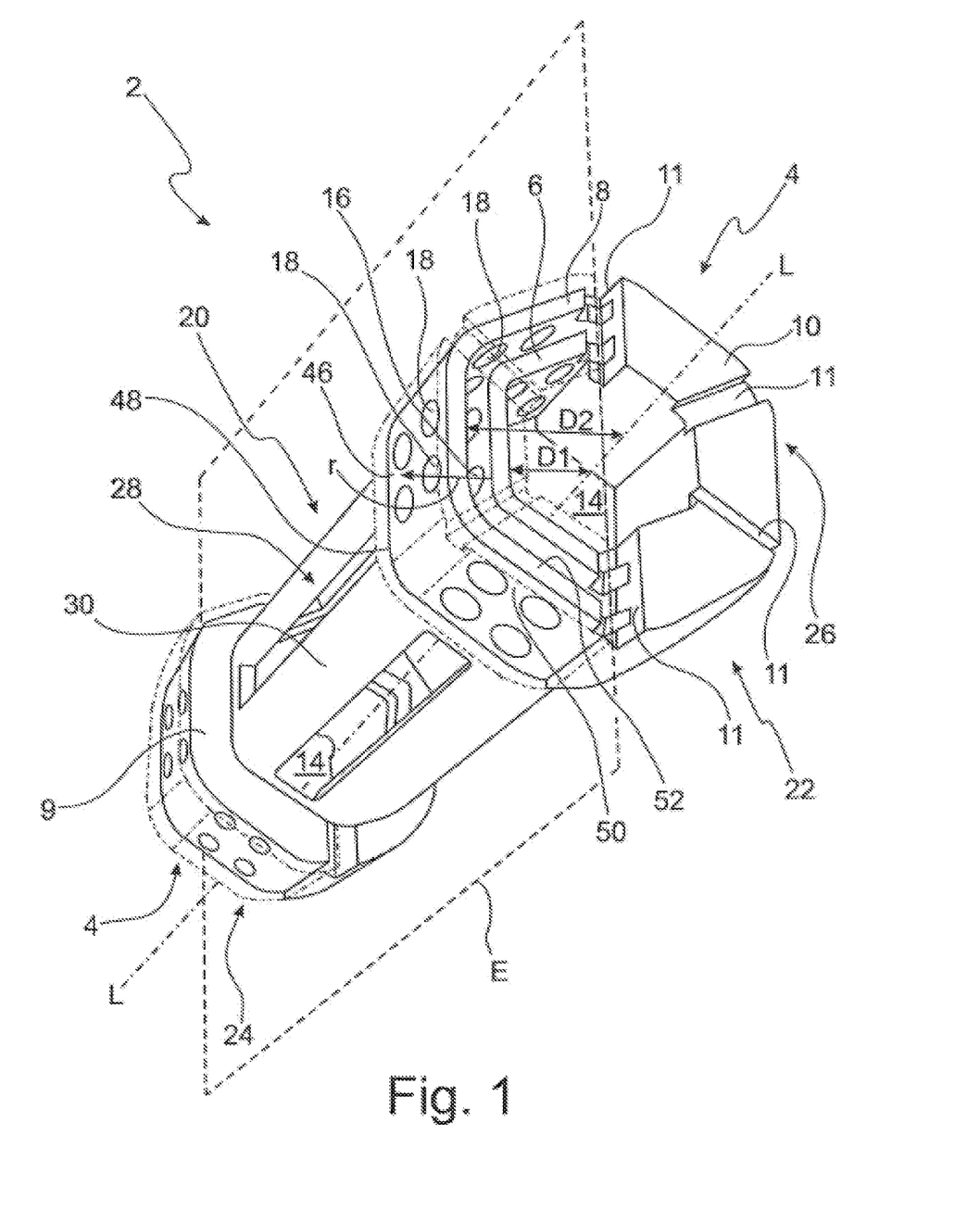
FIG. 1 shows a reinforcing element according to the invention in a perspective view.

FIG. 1 shows a reinforcing element 2 for a liquid container 64 (FIG. 5) for a motor vehicle. In the present case, the liquid container 64 is a fuel tank 64. The reinforcing element 2 has a connecting section 4 for connecting the reinforcing element 2 to the liquid container 64.

The connecting section 4 has a first web 6 and a second web 8 made from a first material. In the present case, the first material is POM. The reinforcing element 2 has a collar 9 which is provided for handling the reinforcing element 2 in automated assembly or joining devices.

Figure 2A:
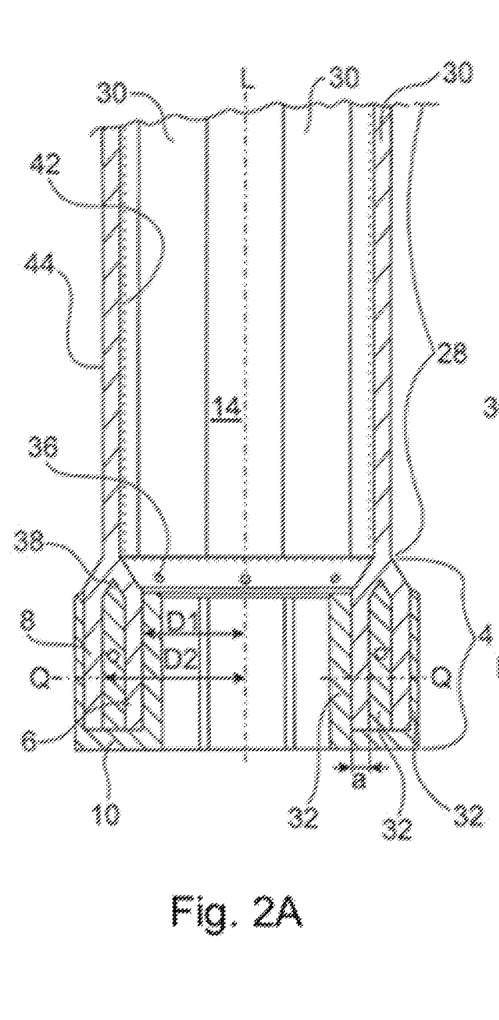
FIG. 2A shows a connecting section of the reinforcing element from FIG. 1 in a longitudinal section.
Figure 2B:
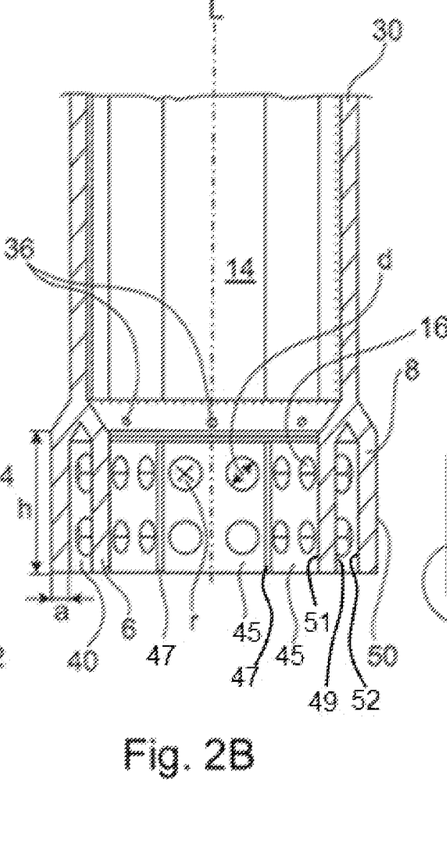
FIG. 2B shows the connecting section of FIG. 2A with the second material 10 omitted.
Figure 2C:
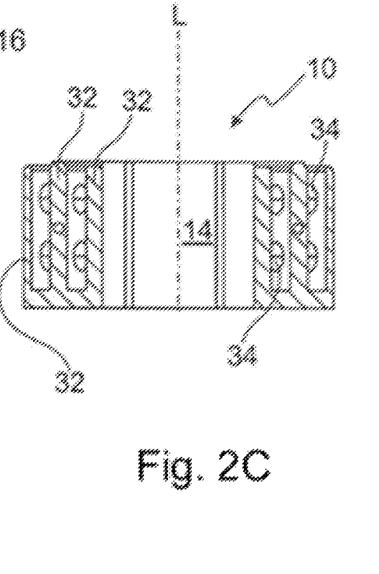
FIG. 2C shows the second material 10 of the connecting section of FIG. 2A.
Figure 3:
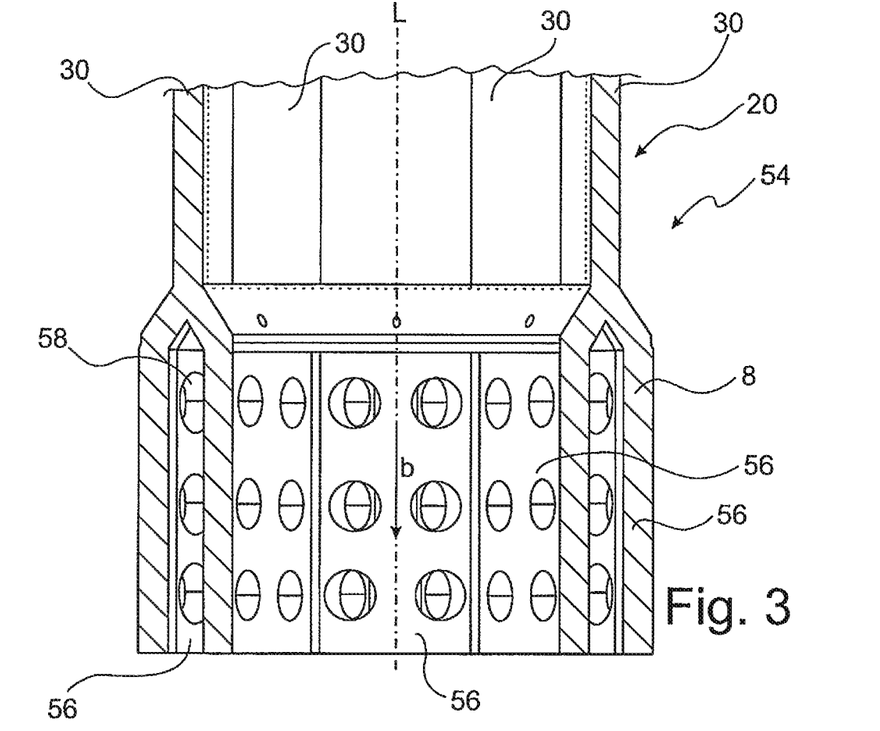
FIG. 3 shows a further connecting section of a reinforcing element according to the invention in a longitudinal section.

The first web 6 and the second web 8 are enclosed by a second material 10. The second material 10 penetrates through openings 16 of the first web 6 and through openings 18 of the second web 8. The first web 6 is at a smaller spacing D1 from a longitudinal axis L of the reinforcing element 2 than the second web 8. A spacing D2 of the second web 8 from the longitudinal axis L is therefore greater than the spacing D1. The spacings D1 and D2 are shown in FIGS. 1, 2 and 3. In the present case, the second material 10 is HDPE.

Channels 11 are formed into the second material 10 on the end side. Fuel which is flushed into the connecting section 4 can flow out between a tank wall and the connecting section 4 via the channels 11 in the finally assembled state.

The webs 6, 8 are arranged in the manner of a double wall. The first web 6 forms a first sleeve, and the second web 8 forms a second sleeve. The second web 8 surrounds the first web 6 on the circumferential side. The webs 6, 8 have a hexagonal shape as viewed in a section transversely with respect to the longitudinal axis L.

In order to improve the comprehensibility of the construction of the connecting section 4, FIG. 1 shows the second material 10 in a transparent manner in a part region of the connecting section 4, as shown by way of the dash-dotted line. It goes without saying that the second material 10 encloses the webs 6, 8 completely on the end side and on the circumferential side in the present case.

The reinforcing element 2 has a through opening 14 which extends along the longitudinal axis L. A through opening 16 of the first web 6 is arranged in alignment with a through opening 18 of the second web 8, as viewed in a direction r transversely with respect to the longitudinal axis.

The through openings 16, 18 of the webs 6, 8 are arranged in a grid-like manner.

The reinforcing element 2 is assembled from two half shells 20, 22 which are connected to one another along a plane E. In each case one connecting section 4 is provided at opposite ends 24, 26 of the reinforcing element 2.

The pull-off forces between the first and the second material are greater than 15 kN. The tensile strength of the first material exceeds the yield stress of the second material 10 by the factor 2.6 or less.

As can be gathered from FIGS. 2A-2C, the webs 6, 8 are integrally formed on a center piece 28 which, in addition to the webs 6, 8, has struts 30 which surround or delimit the through opening 14 in sections on the circumferential side, which through opening 14 extends along the longitudinal axis L. The struts 30 comprise a predetermined break point which fails first in the case of overloading in a direction transversely with respect to the longitudinal axis, with the result that the end-side connecting sections 4 are separated from one another.

The wall thickness or web thickness which is measured in a direction transversely with respect to the longitudinal axis can be from 2 mm to 8 mm, in the present case 5 mm. The web height h which is measured parallel to the longitudinal axis L can be from 10 mm to 80 mm, in the present case 40 mm. The diameter d of the through openings 16, 18 can be from 3 to 20 mm, in the present case 5 mm.

In the present case, the second material 10 is formed in the manner of a cap which terminates the reinforcing element 2 on the end side (FIG. 2A). For its part, the second material 10 has webs 32 which engage around the webs 6, 8 of the first material and penetrate with transverse struts 34.

The second material 10 is formed in an injection molding operation by way of overmolding of the webs 6, 8. In order to illustrate the shape which results in the process for the second material 10, the second material 10 is shown separately in FIG. 2C.

Three webs 32 of the second material 10 are connected to one another via the transverse struts 34. Said transverse struts 34 are arranged in the region of the connecting section 4 within the through openings 16, 18 and ensure a positively locking connection of the first material to the second material 10.

The webs 6, 8 are assigned ventilating openings 36 which, starting from a common groove bottom 38 of the webs 6, 8 or an intermediate space 40 which is formed between the webs 6, 8 before the introduction of the second material 10, penetrate the webs 6, 8 and open in the region of an inner shell face 42 or an outer shell face 44.

Referring to FIG. 1, in the present case, the second webs 8 are formed from six web segments 46 which merge into one another via corner segments or corner regions 48. In each case four through openings 18 are arranged in each web segment 48 between an outer planar face 50 and an inner planar face 52. Referring to FIG. 2B, the first webs 6 are similarly formed from six web segments 45 which merge into one another via corner segments or corner regions 47, and four through openings 16 are arranged in each web segment 45 between an outer planar face 49 and an inner planar face 51.

A five-layer wall construction results in the region of the connecting section 4 in the longitudinal section which is shown or else as viewed in a section Q transversely with respect to the longitudinal axis L.

Referring to FIG. 3, in a further refinement of a connecting section 54, six through openings 58 are arranged on a web segment 56. The through openings 58 are arranged in three rows as viewed in an axial direction b along the longitudinal axis L.

Figure 4:
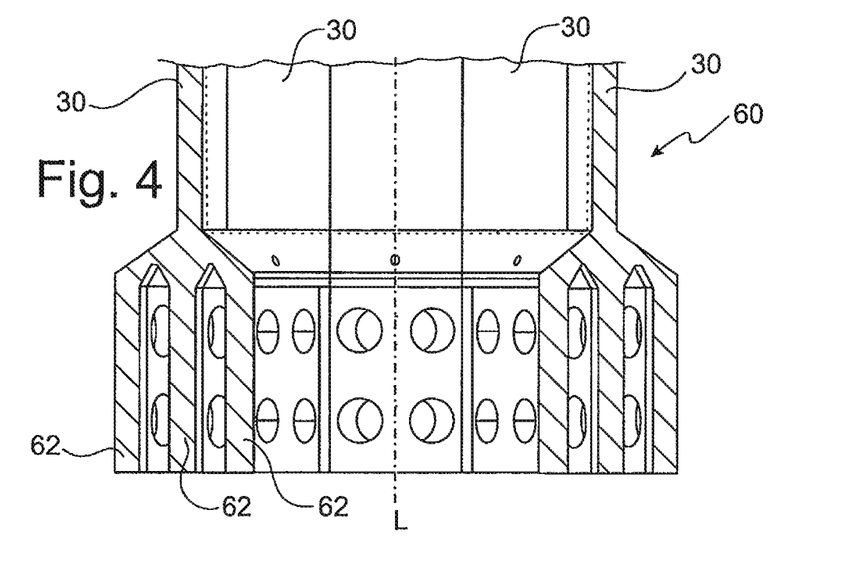
FIG. 4 shows a further connecting section of a reinforcing element according to the invention in a longitudinal section.

Referring to FIG. 4, in a further refinement of a connecting section 60, three webs 62 are provided.

Figure 5:
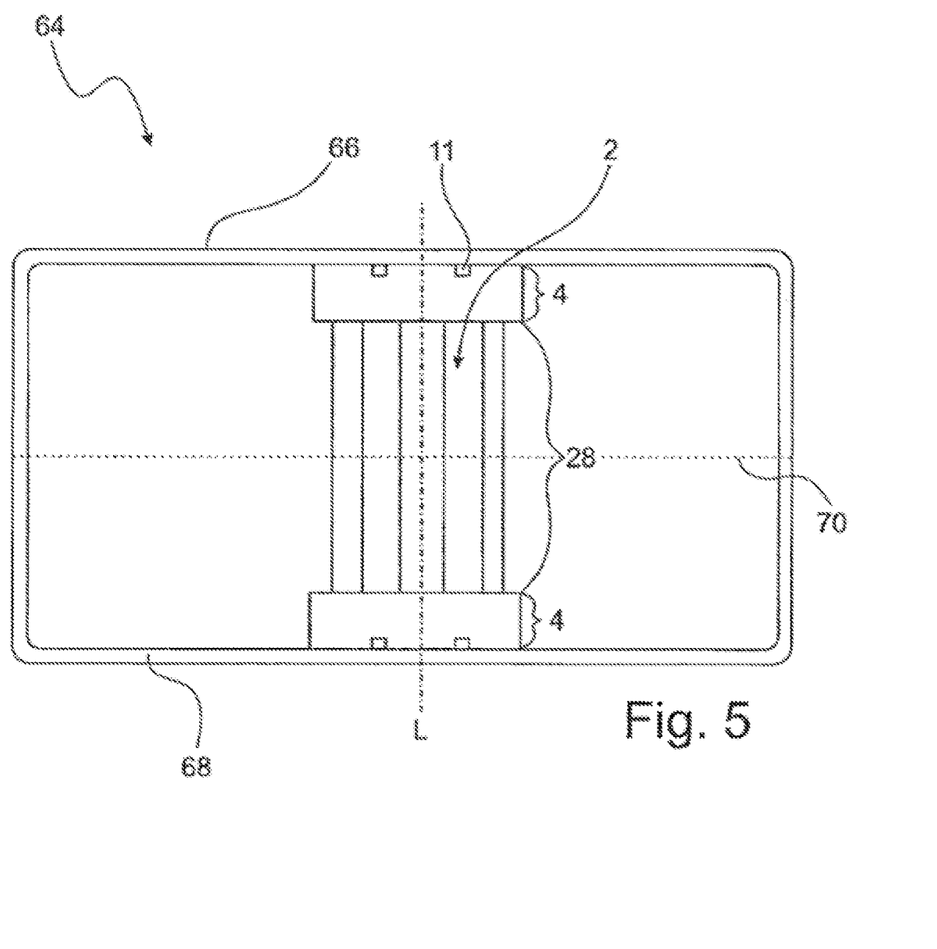
FIG. 5 shows a liquid container according to the invention for a motor vehicle in a cross section.

FIG. 5 shows a liquid container 64 for a motor vehicle. The liquid container 64 has an upper half shell 66 and a lower half shell 68. The half shells 66, 68 have been welded to one another along a connecting plane 70. The half shells 66, 68 are connected to one another with the aid of an above-described reinforcing element 2 of FIGS. 1 and 2A-2C. The connecting sections 4 which are arranged at opposite ends of the reinforcing element 2 are welded in each case to the half shell 66 and the half shell 68. The connecting sections 4 are connected to one another via the center piece 28.

Figure 6:
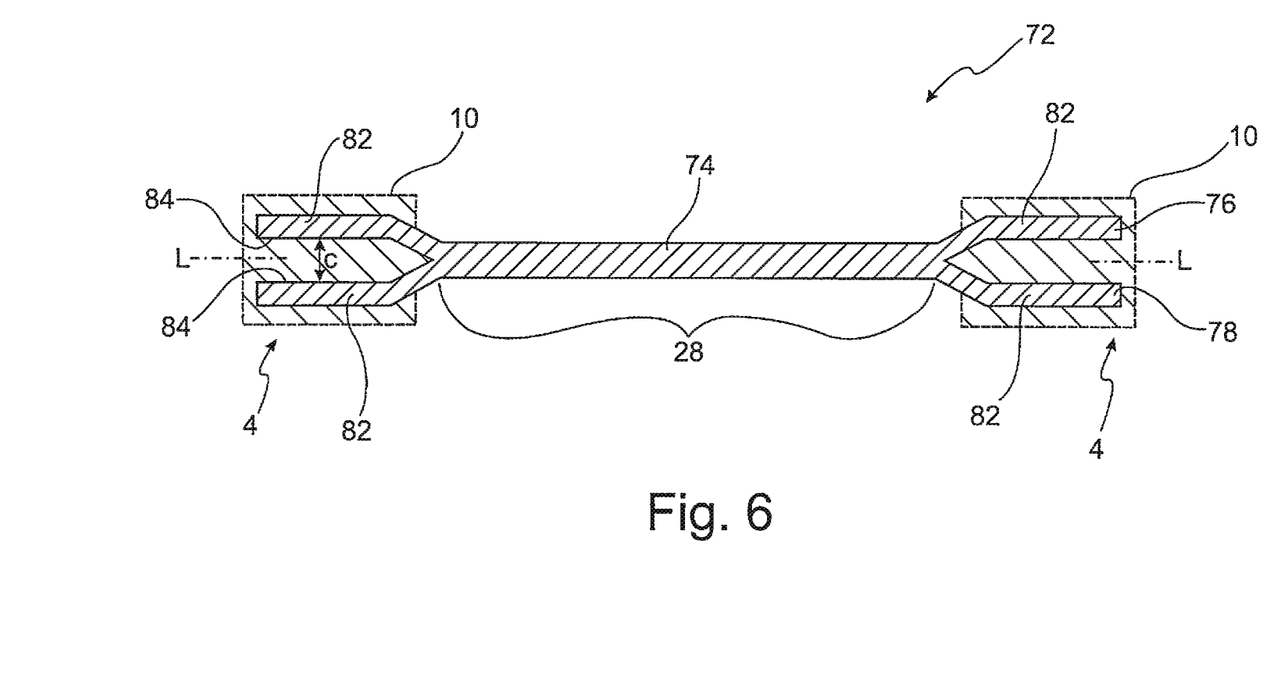
FIG. 6 shows a reinforcing element according to the invention in a longitudinal section.

FIG. 6 shows a further reinforcing element 72 in a cross section. The reinforcing element 72 has two end-side connecting sections 4. The end-side connecting sections 4 in each case have a first web 76 and a second web 78. The webs 76, 78 are surrounded and penetrated by a second material 10. Furthermore, the reinforcing element 72 has a center piece 28 which is configured as a plate-shaped or strip-shaped strut 74 in the present case. Starting from the plate-shaped or strip-shaped strut 74 which has a constant cross section as viewed along a longitudinal axis L, the webs 76, 78 are branched in a fork-shaped manner. The webs 76, 78 have substantially the same wall thickness as the plate-shaped strut 78 of the center piece 28.

Figures 7A, 7B:
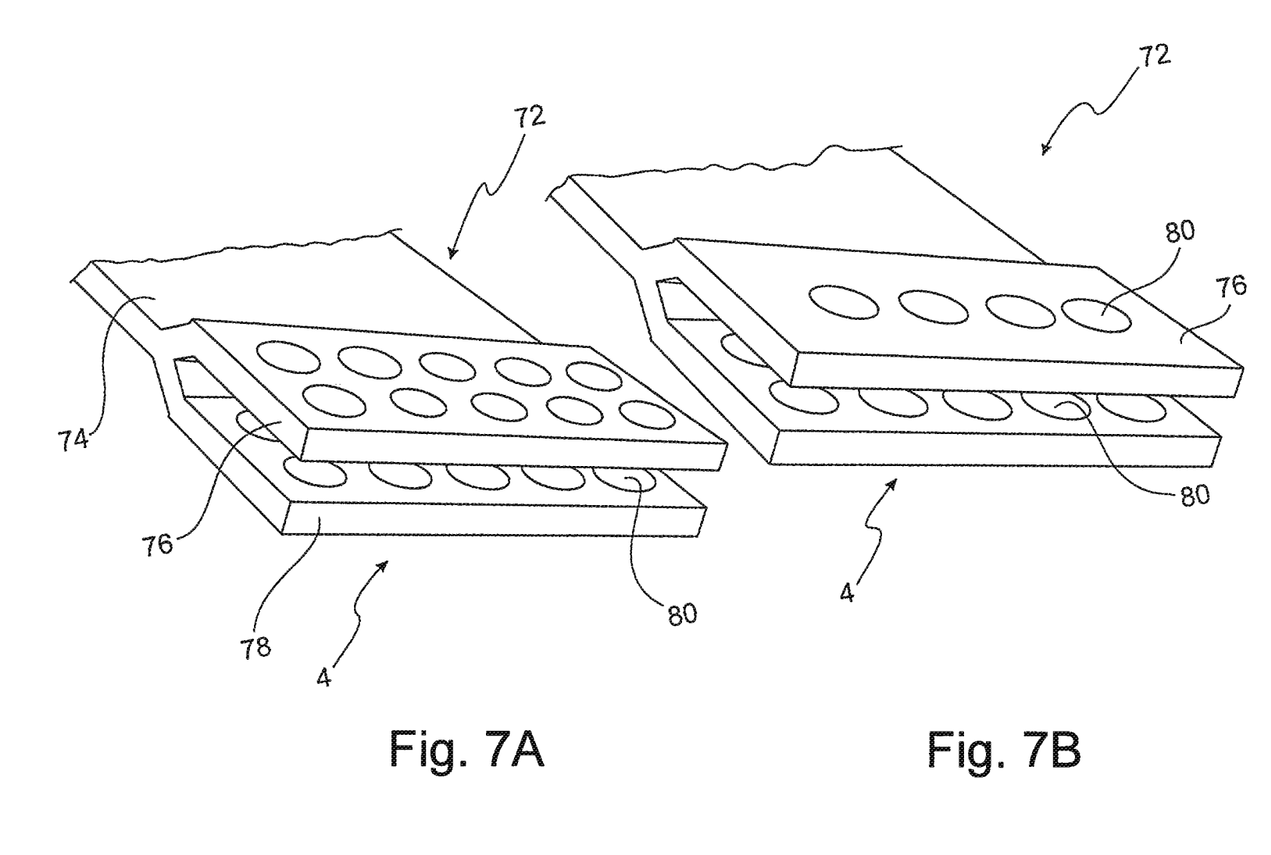
FIG. 7A shows one refinement of a connecting section of the reinforcing element from FIG. 6 in a perspective view.
FIG. 7B shows a further refinement of a connecting section of the reinforcing element from FIG. 6 in a perspective view.

FIGS. 7A and 7B show possible refinements of the webs 76, 78. In accordance with FIG. 7A, the webs 76, 78 have through openings 80 which are arranged in alignment. The webs 76, 78 in accordance with FIG. 7B show a further variant of the arrangement of through openings 80 which have an offset with respect to one another. Here, the web 76 in accordance with FIG. 7A has a single row of through openings 80, whereas the web 78 in accordance with FIG. 7B has a double-row arrangement of through openings 80. The arrangement of through openings 80 in the region of the webs 76, 78 in accordance with FIG. 7A is symmetrical, which results in a regular, aligned arrangement of the through openings 80.

As can be gathered from the perspective illustration of FIGS. 7A and 7B, the webs 76, 78 are branched in a fork-shaped manner starting from the center piece 28 or the plate-shaped strut 74 of the center piece 28. For improved comprehensibility of the geometry of the webs 76, 78 and the arrangement of the through openings 80, FIGS. 7A and 7B have dispensed with the illustration of the second material 10. It goes without saying that, in the case of the reinforcing element 72 which is shown in accordance with FIGS. 6, 7A and 7B, the respective webs 76, 78 are provided with a second material 10 which is provided for the attachment of the reinforcing element 72 to the inner walls of a fuel tank.

The webs 76, 78 are at a constant spacing c from one another. The first web 76 and the second web 78 have a plate-shaped section 82. The through openings 80 are arranged in each case in the plate-shaped section 82. The plate-shaped sections 82 have planar faces 84 which face one another and are oriented substantially parallel to one another.

Figure 8:
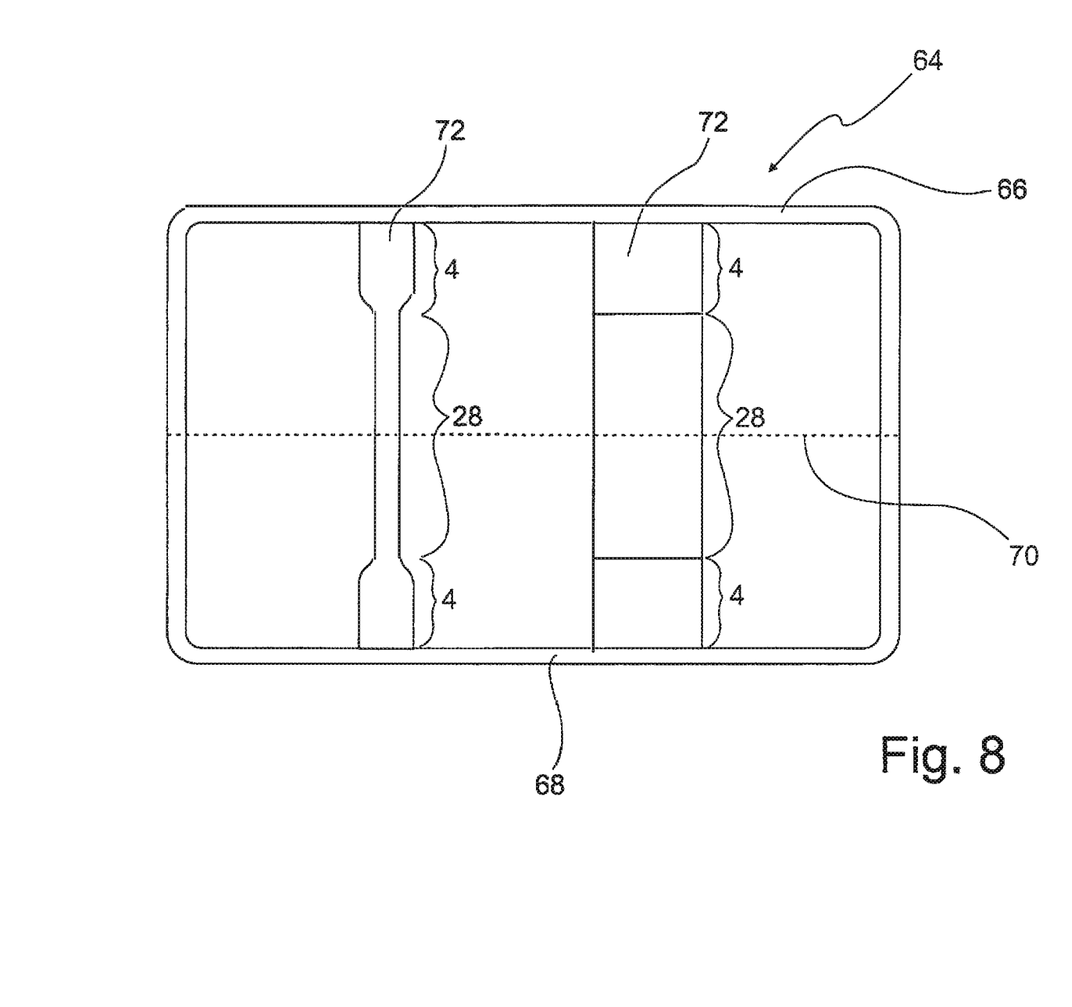
FIG. 8 shows a liquid container according to the invention for a motor vehicle in a cross section.

FIG. 8 shows, by way of example, the incorporation of reinforcing elements 72 into a fuel tank 64. The respective connecting sections 4 are welded to the half shells 66, 68 and thus bring about stiffening of the structure of the fuel tank 64.

The invention claimed is:

1. A reinforcing element for a liquid container for a motor vehicle, comprising:
    a connecting section having at least a first web and a second web which are made from a first material and are at least partially enclosed by a second material;
    the second material penetrating through openings of the first web and openings of the second web;
    wherein at least respective portions of the first web and the second web are arranged in the form of a double wall.

2. The reinforcing element of claim 1, wherein the first web is at a smaller spacing from a longitudinal axis of the reinforcing element than the second web.

3. The reinforcing element of claim 1, wherein the first web and the second web each have a polygonal shape as viewed in a section transversely with respect to a longitudinal axis of the reinforcing element.

4. The reinforcing element of claim 1, wherein the first web and the second web further include ventilating openings.

5. The reinforcing element of claim 1, wherein the reinforcing element has a through opening which extends along a longitudinal axis of the reinforcing element and is at least partially surrounded on a circumferential side by at least one of the first web and the second web.

6. The reinforcing element of claim 1, wherein at least one of the openings of the first web is arranged at least partially in alignment with at least one of the openings of the second web, as viewed, starting from a longitudinal axis of the reinforcing element, in a direction transversely with respect to the longitudinal axis.

7. The reinforcing element of claim 1, wherein the second material encloses the first web and the second web on respective end sides and on respective circumferential sides thereof;
   wherein the reinforcing element is assembled from two half shells; and
   wherein the connecting section is a first connecting section provided at a first end of the reinforcing element; and
   wherein the reinforcing element further comprises a second connecting section provided at a second end of the reinforcing element opposite the first end of the reinforcing element.

8. The reinforcing element of claim 1, wherein the first material is a PA, PAI, PEEK, PAEK, PPA, PBT, PE, HDPE, POM, PPS or PA; and
   wherein the second material is a PA, PAI, PEEK, PAEK, PPA, PBT, PE, HDPE, POM, PPS or PA.

9. The reinforcing element of claim 1, wherein pull-off forces between the first material and the second material are greater than or equal to 15 kN; and
   wherein a tensile strength of the first material exceeds a yield stress of the second material by a factor of 2.6 or less.

10. The reinforcing element of claim 1, wherein at least respective portions of the first web and the second web are at a constant spacing from one another; and
    wherein the first web and the second web each have a cuboid or plate-shaped section, and the respective openings of the first web and the second web are arranged in the respective cuboid or plate-shaped sections.

11. The reinforcing element of claim 1, wherein the first web and the second web are branched in a fork-like manner starting from a center piece; and
    wherein a first connecting section is provided at a first end and a second connecting section is provided at a second end of the reinforcing element, which second end lies opposite the first end and is connected to the first end via the center piece.

12. The reinforcing element of claim 1, wherein the reinforcing element has a center piece which has at least one strut.

13. The reinforcing element of claim 1, wherein the respective openings of the first web and the second web have an axial offset with respect to one another.

14. The reinforcing element of claim 1, wherein the first web forms a first sleeve, and the second web forms a second sleeve that at least partially surrounds the first sleeve on a circumferential side thereof.

15. The reinforcing element of claim 1, wherein each of the openings of the first web are arranged in alignment with at least one of the openings of the second web, as viewed in a direction transversely with respect to a longitudinal axis of the reinforcing element.

16. The reinforcing element of claim 1, wherein the respective openings of at least one of the first web and the second web are arranged in multiple rows.

17. A liquid container for a motor vehicle, comprising:
    a reinforcing element arranged in an interior space of the liquid container, the reinforcing element including:
       a connecting section having at least a first web and a second web which are made from a first material and are at least partially enclosed by a second material;
       the second material penetrating through openings of the first web and openings of the second web;
       wherein at least respective portions of the first web and the second web are arranged in the form of a double wall.

18. A reinforcing element for a liquid container for a motor vehicle, comprising:
    a connecting section having at least a first web and a second web which are made from a first material and are at least partially enclosed by a second material;
    the second material penetrating through openings of the first web and openings of the second web;
    wherein the first web is at a smaller spacing from a longitudinal axis of the reinforcing element than the second web.

* * * * *